United States Patent [19]
Spence et al.

[11] Patent Number: 5,876,021
[45] Date of Patent: Mar. 2, 1999

[54] RAILING SPINDLE OR BALUSTER

[75] Inventors: Jonathan P. Spence, 215 N. Broad St., Grove City, Pa. 16127; John J. Hronas, Erie, Pa.

[73] Assignee: Jonathan P. Spence, Grove City, Pa.

[21] Appl. No.: 741,021

[22] Filed: Oct. 28, 1996

[51] Int. Cl.⁶ .................................................. E04F 11/18
[52] U.S. Cl. .............................................. 256/19; 256/65
[58] Field of Search .................... 256/19, 65, 59; 264/275

[56] References Cited

U.S. PATENT DOCUMENTS

| | | | |
|---|---|---|---|
| D. 315,415 | 3/1991 | Anthony et al. | D25/126 |
| 2,465,276 | 3/1949 | Ryder | 264/275 X |
| 3,158,224 | 11/1964 | Van Name et al. | 403/268 X |
| 3,200,554 | 8/1965 | Goodman et al. | 52/727 |
| 3,991,146 | 11/1976 | Barrie | 264/275 X |
| 4,035,978 | 7/1977 | Bajorek et al. | 52/727 |
| 4,038,802 | 8/1977 | Bajorek et al. | 52/731 |
| 4,043,721 | 8/1977 | Lemelson | 425/116 |
| 4,381,908 | 5/1983 | Roth | 264/275 X |
| 4,470,579 | 9/1984 | Aho | 256/19 X |
| 4,858,891 | 8/1989 | Boes | 256/19 |
| 5,303,900 | 4/1994 | Zulick et al. | 256/19 X |
| 5,507,473 | 4/1996 | Hammer et al. | 256/19 X |
| 5,613,664 | 3/1997 | Svalbe | 256/19 |
| 5,626,331 | 5/1997 | Erwin | 256/19 X |

*Primary Examiner*—Anthony Knight
*Attorney, Agent, or Firm*—Webb Ziesenheim Bruening Logsdon Orkin & Hanson, P.C.

[57] ABSTRACT

Spindles, balusters, and railing posts are injection molded to encase reinforcing rods or tubes. Preferably the rods or tubes are magnetically responsive, which permits them to be held in place by magnets during the molding process.

21 Claims, 7 Drawing Sheets

RAILING SPINDLE OR BALUSTER

TECHNICAL FIELD

This invention is a baluster or spindle which has its primary use in railings, such as in outdoor decks and the like. It includes railing posts and fully constructed railings using the balusters.

BACKGROUND OF THE INVENTION

While balusters or spindles for deck and porch railings continue to be made of wood, the use of synthetic resins has many advantages, such as a reduction in or elimination of the necessity for painting or otherwise coating, good weatherability, excellent wear, good appearance, versatility of design, and inexpensive production. Wood may crack over time, frequently is chemically treated to prevent microbial and insect infestation, and can require frequent protective coatings. Combinations of angular and round surfaces are rare because the round parts must be individually turned on a lathe. In addition, wood naturally comes with inevitable imperfections such as knots and grain separation.

One of the negative aspects of using synthetic resins has been the more or less arbitrary prohibition and/or regulation of synthetic resin spindles on the theory that small children can distort them, sometimes pinching themselves between the spindles or otherwise injuring themselves. Although synthetic resins have wide ranges of tensile strength, impact resistance, stiffness and other relevant properties, regulatory agencies and sometimes the customers themselves may simply ignore the differences and assume that "plastic" is inferior. Accordingly there is a need for a synthetic resin spindle which is manifestly rigid.

Ease and particularly versatility of assembly are other attributes sought for spindles for railings. It would be desirable, for example, to be able to make railings of some variation in height using a spindle of a standard design.

It is known to encase a reinforcing member within a synthetic resin body. See, for example, Lemelson U.S. Pat. No. 4,043,721.

In U.S. Pat. No. 3,200,554, Goodman et al encase a metal tube in wood (saying plastic may be used also) to make a lamp pole. The encasement is accomplished by fabrication, however, not in a mold as in the present invention.

Bajorek et al, in U.S. Pat. Nos. 4,035,978 and 4,038,802, also fabricate covers for bars, spindles, or balusters. The covers have two sections having mating surfaces, in one case longitudinal and in the other sectional. Such a construction does not intimately embed the reinforcing rod or tube as does applicant's.

In Design Pat. No. 315,415, Anthony illustrates a "decorative vertical support" having a profile with a round central portion and two square end portions. This may be of interest to the reader because applicant's preferred end portions are also substantially square, but they are separate sleeves designed to pass over the ends of the reinforced portion.

SUMMARY OF THE INVENTION

Our invention is a synthetic resin spindle or baluster having at least two parts, the main body of which encases a metal or other rigid rod or tube for reinforcement. The parts are easily assembled by simple insertion of the ends of the main body into sleeves; the sleeves are then inserted into sockets of complementary profiles, usually routed into the upper and lower rails.

Because our reinforcement rod or tube extends substantially throughout the length of the main body of the spindle, i.e. well into its end portions which are inserted into the synthetic resin sleeves, it has improved strength after assembly.

The main body of the spindle is preferably injection molded and the other parts may be extruded. Injection molding of the main body is conducted so as to ensure that the rigid rod is and remains in the correct place during the molding process. This is accomplished preferably through the use of magnets; accordingly in the preferred process and spindle construction, the reinforcing rod or tube is made of a magnetic-responsive material, generally steel.

The main body of the spindle may also be compression molded and/or formed using a clam shell mold following the continuous extrusion of a strand surrounding a more or less continuous length of rod or tube which is later cut into the appropriate lengths. In a preferred compression-molding process, a reinforcing tube is held in place by a mandrel extending throughout its length and protruding from the mold at both ends; the ends may be trimmed after the synthetic material is set.

DETAILED DESCRIPTION OF THE INVENTION

Figure 1:
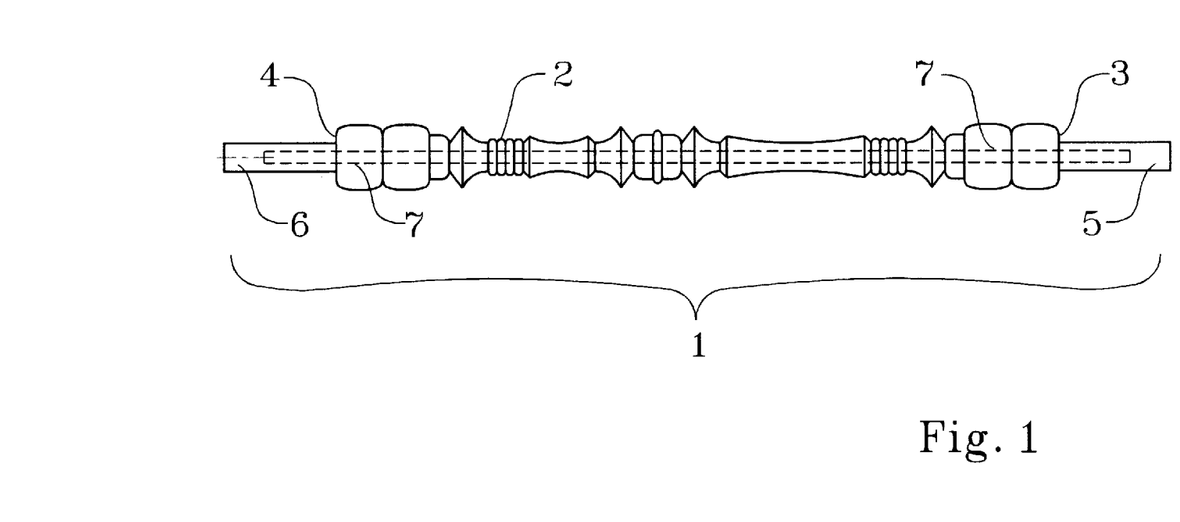
FIG. 1 illustrates the main body of the spindle reinforced by a rod.

Referring now to the drawings, in FIG. 1, the main body 1 is seen to be an elongated member which has a central design portion 2 terminating in ledges 3 and 4 which also define the limit of insert portions 5 and 6. Main body 1 is made of synthetic resin material, which encases reinforcing rod 7. By encasing the reinforcing rod or tube, we mean that a length of the reinforcing rod or tube is intimately in contact with the synthetic thermoplastic resin when the mold is filled with molten thermoplastic resin and continues to be intimately in contact with it after the resin solidifies. Encasement does not need to be continuous throughout the entire length of the reinforcing rod or tube, but the surface area of the rod or tube which is intimately in contact with the resin should be sufficient to provide substantial reinforcement to the finished structure. Reinforcing rod 7 may be of steel or other rigid material; it extends substantially throughout the length of main body 1. It will be understood that reinforcing rod 7 may be hollow, i.e. in the nature of a tube; it may also be equipped with appendages or rough surfaces to enhance its grip on the plastic.

Figure 2:
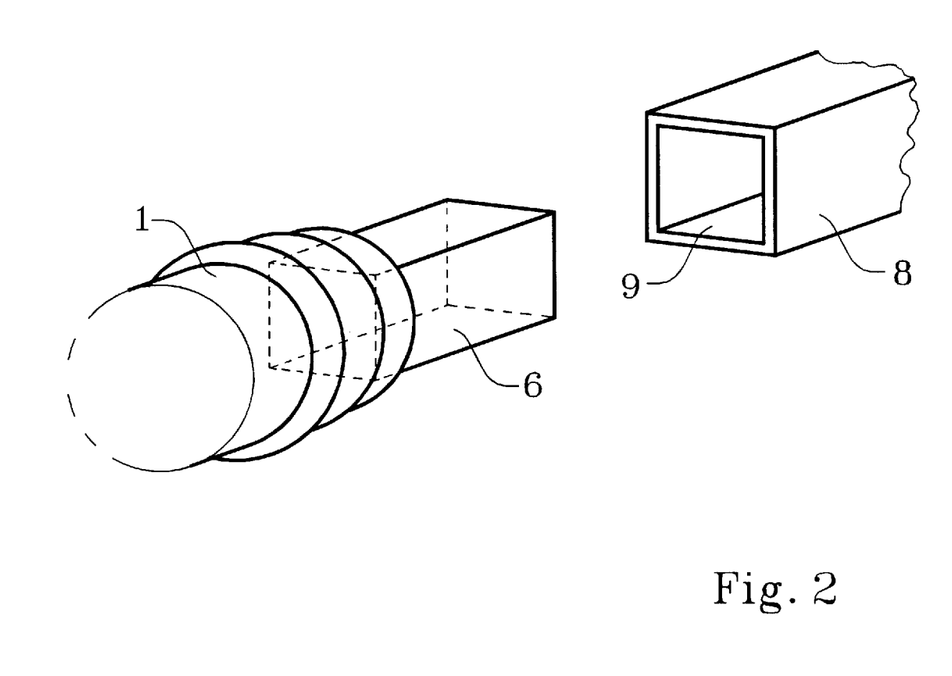
FIG. 2 shows an end piece juxtaposed next to an insert from the main body of the spindle.

In this preferred version, both insert portions 5 and 6 are present. They have profiles which are complementary to the internal profiles of a sleeve such as illustrated in FIG. 2. Magnet holes 37 are left in the insert portions 5 and 6 by magnets used during the molding process, as will be further illustrated below.

In FIG. 2, sleeve 8 is seen ready to receive insert portion 6 of main body 1. Sleeve 8 is preferably extruded, and has an internal profile 9 similar to and complementary to the external profile of insert portion 6. Insert portion 5 (FIG. 1) may be inserted into a second sleeve. It will be observed that the sleeves may be manufactured of different lengths in order to vary the height of the railing, i.e. the vertical distance between the upper railing and the lower railing.

Figure 3:
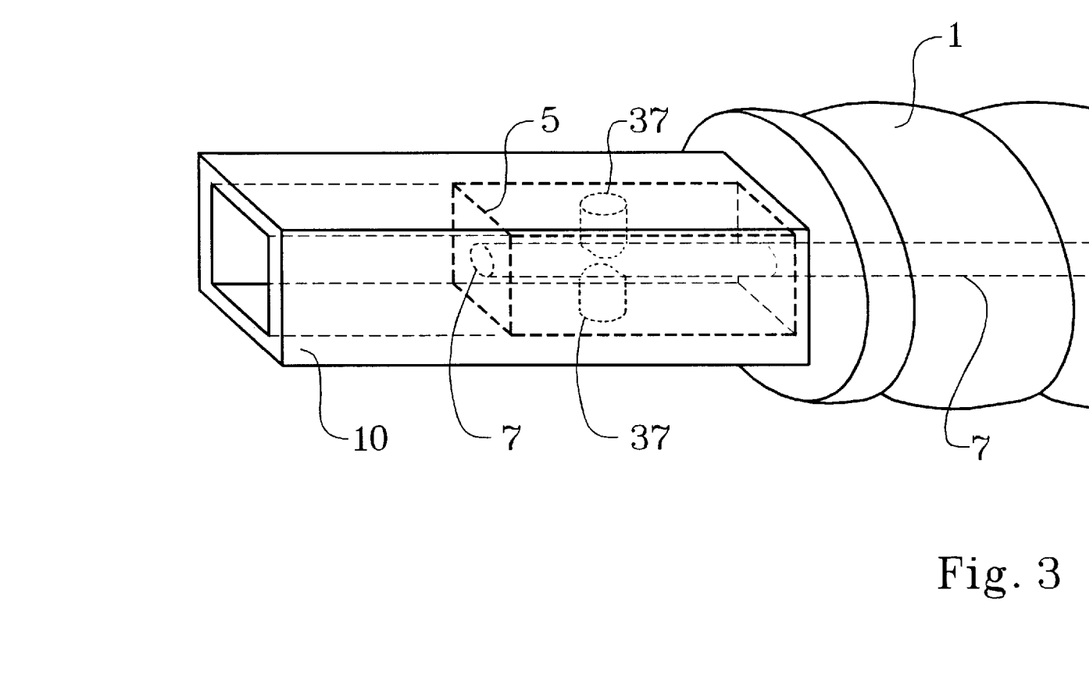
FIG. 3 shows an assembled end of the spindle of our invention.

In FIG. 3, a second sleeve 10 is seen enveloping insert portion 5 of main body 1, which encases reinforcing rod 7. Sleeve 10 covers magnet holes 37.

Figure 4:
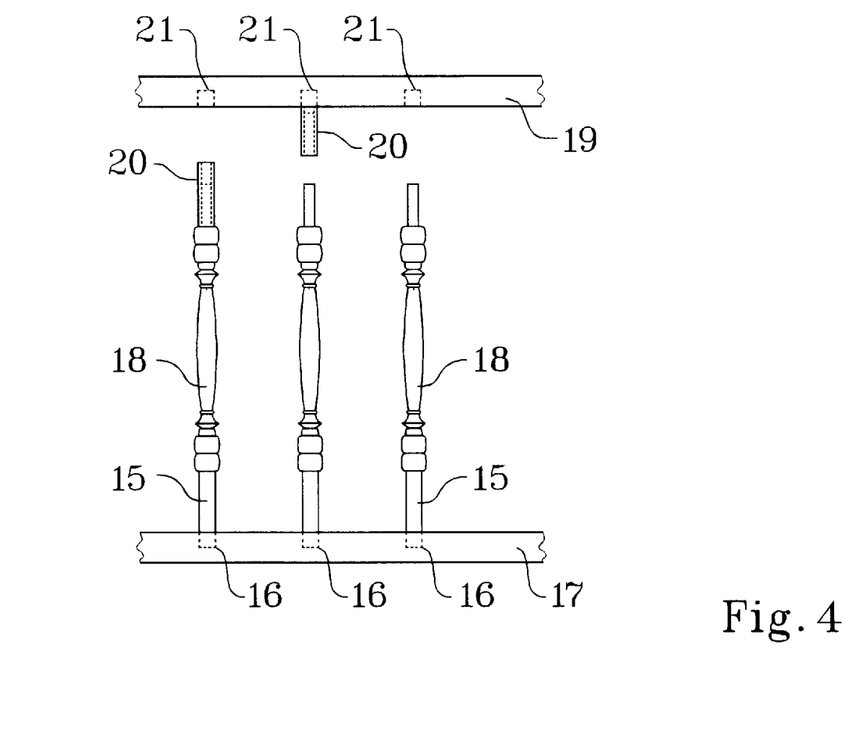
FIG. 4 is a railing of our invention in the process of assembly.

In FIG. 4, lower sleeves 15 have been inserted into the appropriate sockets 16 in lower rail 17, and the spindles 18 have been inserted into the sleeves 15. Upper rail 19 has been moved into position for the insertion of upper sleeves 20 into sockets 21.

Figure 5:
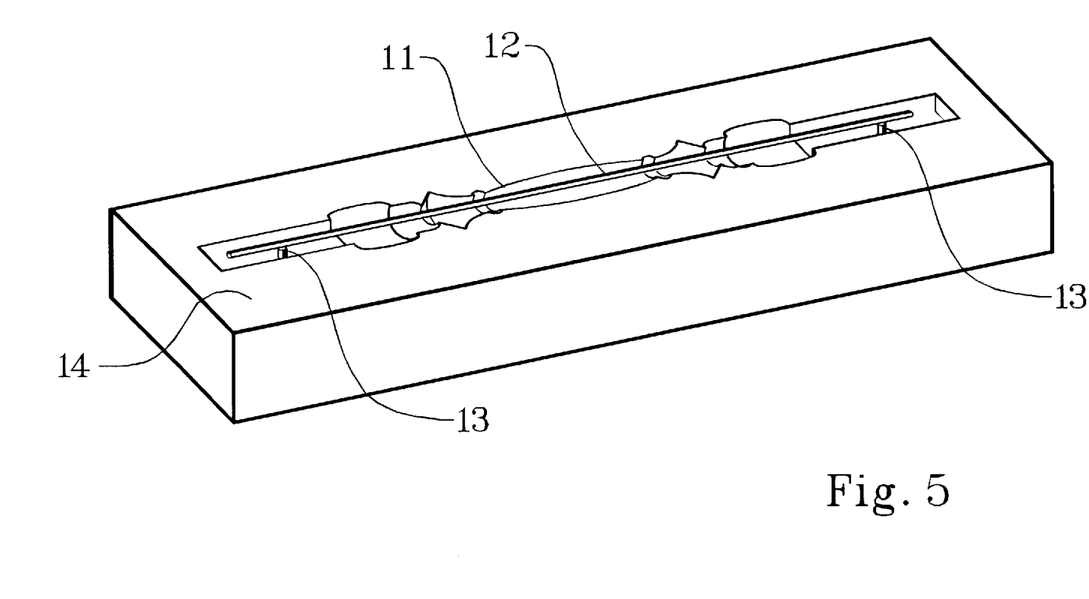
FIG. 5 shows the magnets holding a reinforcing tube in preparation for closing the mold prior to injection molding.

FIG. 5 illustrates the spindle mold half 14 having a reinforcing rod 12 held in place with magnets 13 prior to closing of the mold. The mold half 14 contains negative pattern 11 for the main body 1 (FIG. 1) of the spindle. The magnets 13 touch reinforcing rod 12 on both ends and, together with similar magnets in the other mold half, hold the rod in place during the injection molding process. They are removed after the process is complete, leaving magnet holes 37 shown in FIGS. 1 and 3. The injection molding process is performed entirely as is well known in the prior art except for the placing and holding of the reinforcing rods 12 in place—that is, a complementary mold half similar to mold half 14 is placed opposite mold half 14 to form a full cavity, the cavity is filled with molten thermoplastic, and permitted to harden, after which the mold is opened and the molded spindle removed having the reinforcing rod intact within it.

Figures 6A, 6B, 6C:
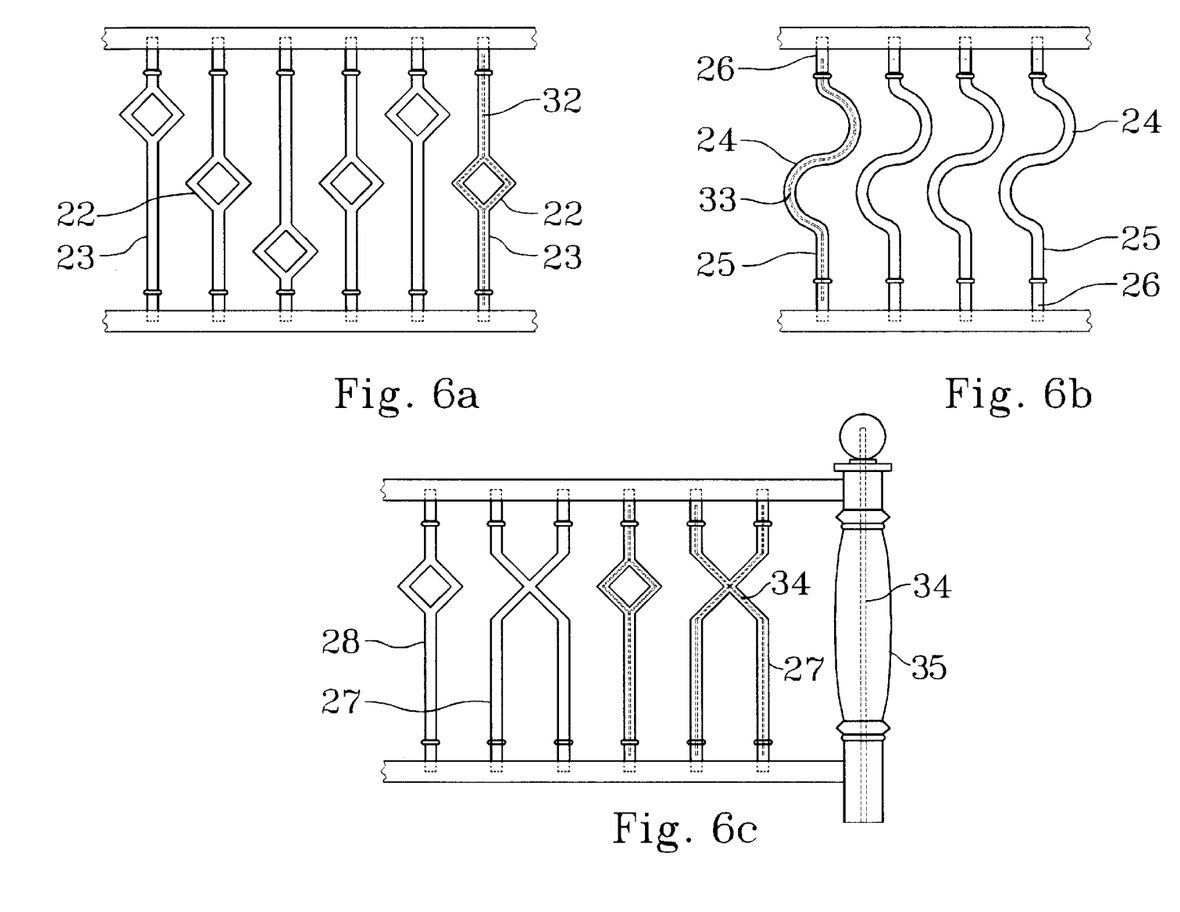
In FIGS. 6a, 6b, and 6c, another advantage of our invention is shown in that spindles of configurations more complex than simple straight poles are easily made.

In FIG. 6, the versatility of the injection molding process is displayed. FIG. 6a shows diamond shaped frames 22 located at three different heights in spindles 23. Spindles 23 each contains a reinforcing rod or tube 32 of the appropriate shape, which may be held in place during manufacture in the mold in the same manner as in FIG. 5. FIG. 6b illustrates the ease with which curves 24 may be placed in the spindles 25 while the square profiles of the sleeves 26 ensure proper orientation of the curves. Again the appropriate rod or tube 33 is embedded in the spindle 25. FIG. 6c shows an upright unit 27 representing intersecting spindles, which may be alternated with spindles 28 having diamond frames such as in FIG. 6a. Each spindle 27 and 28 encases a rigid reinforcing tube or rod 34 of the appropriate shape. A reinforcing rod 34 is also encased in post 35 in the same manner as illustrated for spindles. Many variations in design may be envisioned. It should be noted that in each of these configurations, a rigid reinforcing member of the appropriate geometry is embedded.

Figure 7:
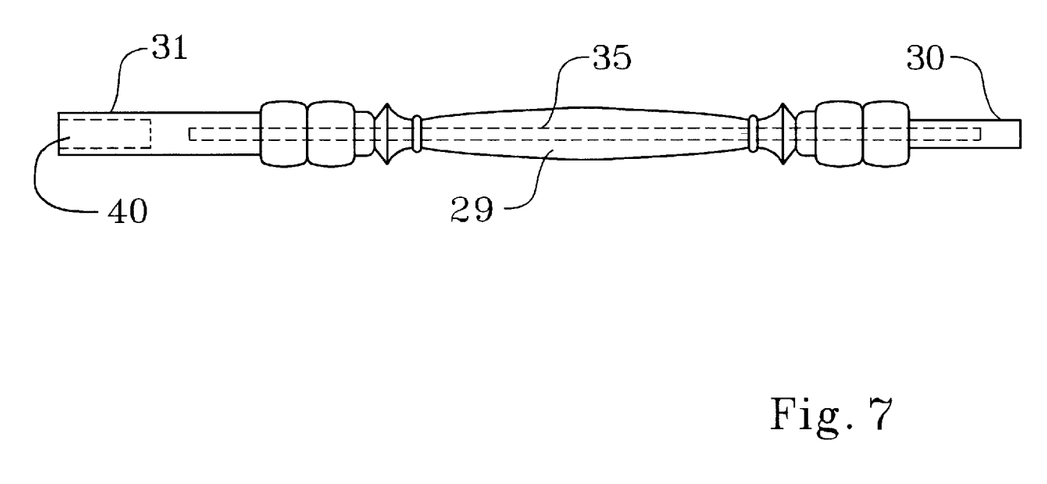
FIG. 7 illustrates a variation of our invention requiring only one sleeve.

FIG. 7 shows a variation in which only one sleeve, such as sleeve 10 in FIG. 3, is necessary. In this case sleeve 29 has one stub or insert end 30 for insertion into a sleeve such as sleeve 10 (FIG. 3) and one fully integral end 31 which has the appearance of a sleeve. Fully integral end 31 need not be completely filled with synthetic resin, but may contain a hollow area 40 as depicted. As with the other variations, spindle 29 is reinforced with an embedded tube or rod 35.

Our invention is seen to include a method of making a spindle comprising providing a mold having a cavity of a desired spindle design, placing therein a magnetic responsive reinforcing member, positioning said reinforcing member with magnets, closing the mold, filling the cavity with molten thermoplastic molding material, and permitting the material to harden. Upon opening the mold to release the finished spindle, the magnets may be removed.

It should be noted that our invention does not require the ends of the sleeves to have square profiles, but they may be of any profile or cross section which will suitably fit into the rail. Likewise the internal profile of the sleeve and the external profile of the ends of the spindle need not be square; they may have any practical shape.

We claim:

1. A composite baluster, comprising:
   an elongated main body having at least one insert portion, the main body made of a synthetic resin material; and
   a reinforcing member located within the main body such that the reinforcing member is in contact with the main body,
   wherein the main body is molded to the reinforcing member and encases the reinforcing member.

2. The composite baluster of claim 1, wherein the main body engages the reinforcing member along the entire length of the reinforcing member.

3. The composite baluster of claim 1, wherein the main body is injection molded to the reinforcing member.

4. The composite baluster of claim 1, further including at least one synthetic resin sleeve and wherein the at least one sleeve is configured to removably receive the at least one insert portion of the main body.

5. The composite baluster of claim 4, wherein the sleeve has a substantially rectangular-shaped internal profile.

6. The composite baluster of claim 1, wherein the main body includes a first end and a second end, the first end configured as the insert portion and the second end having a hollow portion.

7. The composite baluster of claim 1, wherein the reinforcing member includes appendages along the length of the reinforcing member.

8. The composite baluster of claim 1, wherein the reinforcing member is a rigid rod.

9. The composite baluster of claim 8, wherein the rigid rod is metal.

10. The composite baluster of claim 1, wherein the reinforcing member is a rigid tube.

11. The composite baluster of claim 10, wherein the rigid tube is metal.

12. A method of making a composite baluster, comprising the steps of:
   providing an injection mold having two mold halves defining a cavity therebetween;
   retaining a reinforcing member within the cavity;
   injecting a thermoplastic synthetic resin into the injection mold such that molten thermoplastic resin fills the injection mold and encases the reinforcing member to form a baluster;
   curing the thermoplastic synthetic resin to form an elongated main body of the baluster having the reinforcing member encased therein;
   opening the mold halves; and
   removing the baluster from the cavity.

13. The method of claim 12, wherein the reinforcing member extends substantially throughout the length of the main body.

14. The method of claim 12, wherein the reinforcing member is a rigid rod.

15. The method of claim 12, wherein the reinforcing member is a rigid tube.

16. The method of claim 12, including retaining the reinforcing member within the cavity with magnets, and further including the step of removing the magnets from the solidified main body.

17. A railing, comprising:

at least one upper rail;

at least one lower rail; and a plurality of composite balusters connected between the at least one upper rail and the at least one lower rail, wherein each baluster includes:
- a. an elongated main body having at least one insert portion, the main body made of a synthetic resin material;
- b. a synthetic resin sleeve removably receiving the at least one insert portion of the main body; and
- c. a reinforcing member located within the main body such that the reinforcing member is in contact with the main body, wherein the main body is molded to the reinforcing member and encases the reinforcing member.

18. The railing of claim 17, further including posts supporting the at least one upper rail and the at least one lower rail.

19. The railing of claim 18, wherein the posts each include:

an elongated member made of synthetic resin; and a reinforcing member located within the elongated member such that the reinforcing member is in contact with the elongated member over substantially an entire length of the reinforcing member, wherein the elongated member is molded to the reinforcing member and encases the reinforcing member.

20. The railing of claim 19, wherein the elongated member engages the reinforcing member along the entire length of the reinforcing member.

21. The railing of claim 20, wherein the posts have the elongated member injection molded to the reinforcing member.

* * * * *